(12) United States Patent
Asahina et al.

(10) Patent No.: US 10,935,126 B2
(45) Date of Patent: Mar. 2, 2021

(54) SHIFT DEVICE

(71) Applicant: KABUSHIKI KAISHA TOKAI-RIKA-DENKI-SEISAKUSHO, Aichi (JP)

(72) Inventors: Naomi Asahina, Aichi (JP); Yutaka Inamura, Aichi (JP); Kenji Nakanishi, Aichi (JP); Keisuke Kameyama, Aichi (JP); Mizuho Maruyama, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 68 days.

(21) Appl. No.: 16/339,232

(22) PCT Filed: Oct. 5, 2017

(86) PCT No.: PCT/JP2017/036326
§ 371 (c)(1),
(2) Date: Apr. 3, 2019

(87) PCT Pub. No.: WO2018/070340
PCT Pub. Date: Apr. 9, 2018

(65) Prior Publication Data
US 2020/0149627 A1 May 14, 2020

(30) Foreign Application Priority Data
Oct. 13, 2016 (JP) .............................. JP2016-201506

(51) Int. Cl.
*F16H 59/08* (2006.01)
*B60K 20/02* (2006.01)
(Continued)

(52) U.S. Cl.
CPC ............ *F16H 59/105* (2013.01); *B60K 20/04* (2013.01); *G05G 1/04* (2013.01); *F16H 2059/0269* (2013.01)

(58) Field of Classification Search
CPC ........ F16H 59/08; F16H 59/10; F16H 59/105; F16H 2059/0269; B60K 20/02; B60K 20/04; G05G 1/04
See application file for complete search history.

(56) References Cited

U.S. PATENT DOCUMENTS 6,415,677 B1    7/2002  Skogward
8,322,245 B2 *  12/2012 Kino ...................... F16H 59/10
                                                74/473.12
(Continued)

FOREIGN PATENT DOCUMENTS

JP        2001515188 A      9/2001
JP        2005206017 A  *   8/2005
(Continued)

*Primary Examiner* — Adam D Rogers
(74) *Attorney, Agent, or Firm* — Roberts Calderon Safran & Cole P.C.

(57) ABSTRACT

At a shift lever device, at a time when a lever is rotated in a left-right direction, a joint of the lever moves a joint tube of a link in an up-down direction. Moreover, at a time when the lever is rotated in a front-rear direction, a link operating portion of the lever rotates an operation tube of the link in the front-rear direction around the joint side. Here, at the time when the lever is rotated in the left-right direction, the joint is moved in the left-right direction with respect to the joint tube. Therefore, the need to provide parts between the lever and the joint can be eliminated, and a number of parts can be reduced.

9 Claims, 7 Drawing Sheets

(51) Int. Cl.
*G05G 1/04* (2006.01)
*F16H 59/10* (2006.01)
*B60K 20/04* (2006.01)
*F16H 59/02* (2006.01)

(56) References Cited

U.S. PATENT DOCUMENTS

| | | | |
|---|---|---|---|
| 9,303,756 B2 * | 4/2016 | Yamamoto | F16H 59/105 |
| 9,939,060 B2 * | 4/2018 | Kato | F16H 59/105 |
| 2017/0191561 A1 * | 7/2017 | Seibold | F16H 59/044 |
| 2018/0238440 A1 * | 8/2018 | Bruck | F16H 59/105 |
| 2020/0001709 A1 * | 1/2020 | Inamura | F16H 59/0278 |

FOREIGN PATENT DOCUMENTS

| | | | | |
|---|---|---|---|---|
| JP | 2012180074 A | * | 9/2012 | |
| JP | 2016141371 A | * | 8/2016 | F16H 59/105 |

\* cited by examiner

SHIFT DEVICE

CROSS-REFERENCE TO RELATED APPLICATIONS

The present application is a U.S. National Phase of PCT/JP2017/036326 filed on Oct. 5, 2017, claiming priority under 35 USC 119 from Japanese Patent Application No. 2016-201506 filed Oct. 13, 2016. The disclosure of which is incorporated by reference herein.

TECHNICAL FIELD

The present invention relates to a shift device in which a shift body is rotated in a first direction and a second direction such that the shift position of the shift body is changed.

BACKGROUND ART

In the steering device disclosed in Japanese Patent Application National Publication No. 2001-515188, a pin of a gear lever is connected to a plate, and, when a steering lever is rotated in the lateral direction, the pin moves the plate in the up-down direction. Further, a connecting portion of the gear lever is connected to the plate, and, when the steering lever is rotated in the length direction, the connecting portion rotates the plate in the length direction around the pin side. Moreover, a detector board detects the position of the plate, and the position of the gear lever is detected.

Here, in this steering device, a spring element is provided between the gear lever and the pin.

SUMMARY OF INVENTION

Technical Problem

In view of the above-described circumstances, an object of the present invention is to provide a shift device in which the number of parts can be reduced.

Solution to Problem

A shift device of a first aspect of the present invention comprises: a shift body that is rotated in a first direction and a second direction such that a shift position of the shift body is changed; a first connecting portion that is provided at the shift body; a second connecting portion that is provided at the shift body; an interlocking body that is provided at a second direction side of the shift body; a first connected-to portion that is provided at the interlocking body and to which the first connecting portion is connected, wherein, when the shift body is rotated in the second direction, the first connecting portion is moved toward the second direction side and moves the interlocking body; a second connected-to portion that is provided at the interlocking body and to which the second connecting portion is connected, wherein, when the shift body is rotated in the first direction, the second connecting portion rotates the interlocking body around a first connecting portion side; and a detector that is provided at the second direction side of the shift body, and that detects a position of the interlocking body such that the shift position of the shift body is detected.

A shift device of a second aspect of the present invention comprises, in the shift device of the first aspect of the present invention, a supported portion that is provided at the shift body, and at which a supported surface that is shaped as a spherical surface is provided, the shift body being supported at the supported surface such that the shift body is rotatable in the first direction and the second direction, and the first connecting portion being provided at the supported portion.

In a shift device of a third aspect of the present invention, in the shift device of the first aspect or the second aspect of the present invention, the second connecting portion is formed in a convex shape, and the second connected-to portion is formed in a shape of a hole.

In a shift device of a fourth aspect of the present invention, in the shift device of any one of the first aspect through the third aspect of the present invention, the second connecting portion is provided at an interlocking body side of the shift body.

A shift device of a fifth aspect of the present invention comprises, in the shift device of any one of the first aspect through the fourth aspect of the present invention, a guiding portion that guides the interlocking body.

A shift device of a sixth aspect of the present invention comprises, in the shift device of any one of the first aspect through the fifth aspect of the present invention, an accommodating body that accommodates the shift body, and that can hold the interlocking body in a state in which the shift body is not connected thereto.

A shift device of a seventh aspect of the present invention comprises, in the shift device of any one of the first aspect through the sixth aspect of the present invention, an accommodating body that accommodates the shift body, wherein a rotation guiding portion that guides rotation of the first connecting portion is provided at the accommodating body.

A shift device of an eighth aspect of the present invention comprises, in the shift device of any one of the first aspect through the seventh aspect of the present invention, an accommodating body that accommodates the shift body, to which the interlocking body is assembled, and to which the detector is assembled at a second direction side of the interlocking body.

Advantageous Effects of Invention

In the shift device of the first aspect of the present invention, the shift body is rotated in the first direction and the second direction such that the shift position of the shift body is changed.

Further, the interlocking body is provided at the second direction side of the shift body. The first connecting portion of the shift body is connected to the first connected-to portion of the interlocking body, and the second connecting portion of the shift body is connected to the second connected-to portion of the interlocking body. Therefore, at the time when the shift body is rotated in the second direction, the first connecting portion moves the interlocking body, and, at the time when the shift body is rotated in the first direction, the second connecting portion rotates the interlocking body around the first connecting portion side.

Moreover, the detector is provided at the second direction side of the shift body. The detector detects the position of the interlocking body such that the shift position of the shift body is detected.

Here, at the time when the shift body is rotated in the second direction, the first connecting portion is moved toward the second direction side with respect to the first connected-to portion. Therefore, the need to provide parts between the shift body and the first connecting portion can be eliminated, and the number of parts can be reduced.

In the shift device of the second aspect of the present invention, the shift body is supported so as to be able to rotate in the first direction and the second direction, at the supported surface, which is shaped as a spherical surface, of the supported portion.

Here, the first connecting portion is provided at the supported portion. Therefore, the number of parts can be reduced.

In the shift device of the third aspect of the present invention, the second connecting portion is formed in a convex shape, and the second connected-to portion is formed in the shape of a hole. Therefore, stress that is applied to the interlocking body from the shift body can be made to be small.

In the shift device of the fourth aspect of the present invention, the second connecting portion is provided at the interlocking body side of the shift body. Therefore, separating of the second connecting portion and the second connected-to portion can be suppressed, and the second direction dimension of at least one of the second connecting portion or the second connected-to portion can be made to be small.

In the shift device of the fifth aspect of the present invention, the guiding portion guides the interlocking body. Therefore, the accuracy of the position of the interlocking body with respect to the shift position of the shift body can be increased, and the accuracy of detecting the shift position of the shift body can be increased.

In the shift device of the sixth aspect of the present invention, the accommodating body accommodates the shift body.

Here, the accommodating body can hold the interlocking body in a state in which the shift body is not connected thereto. Therefore, the shift body can be connected to the interlocking body that the accommodating body holds.

In the shift device of the seventh aspect of the present invention, the accommodating body accommodates the shift body.

Here, the rotation guiding portion of the accommodating body guides the rotation of the first connecting portion. Therefore, the accuracy of the position of the interlocking body with respect to the shift position of the shift body can be increased, and the accuracy of detecting the shift position of the shift body can be increased.

In the shift device of the eighth aspect of the present invention, the accommodating body accommodates the shift body.

Here, the interlocking body is assembled to the accommodating body, and the detector is assembled to the accommodating body at the second direction side of the interlocking body. Therefore, the interlocking body and the detector can be assembled easily.

DESCRIPTION OF EMBODIMENTS

Figure 1:
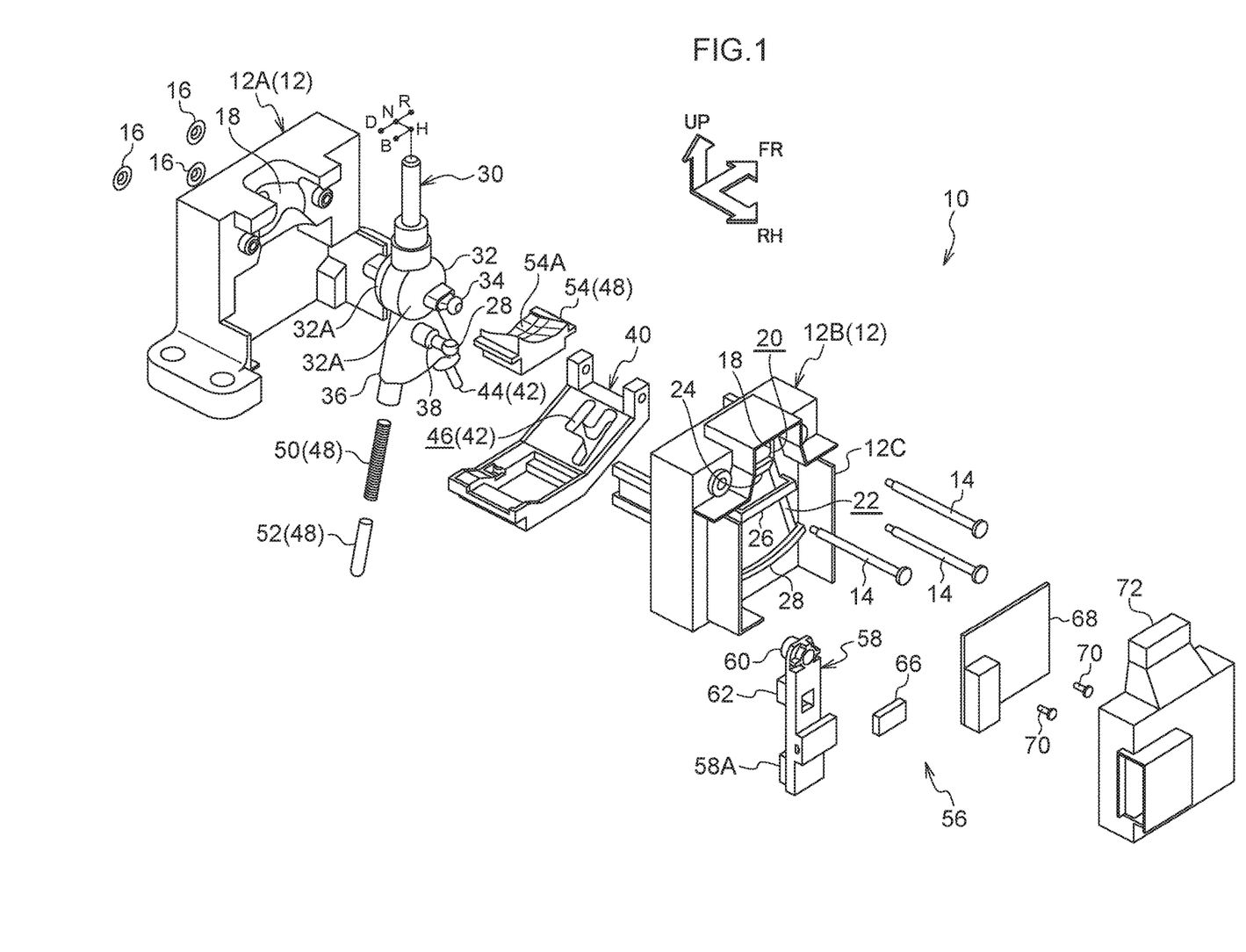
FIG. 1 is an exploded perspective view that is seen from an obliquely right and rear side and shows a shift lever device relating to an embodiment of the present invention.
Figure 3:
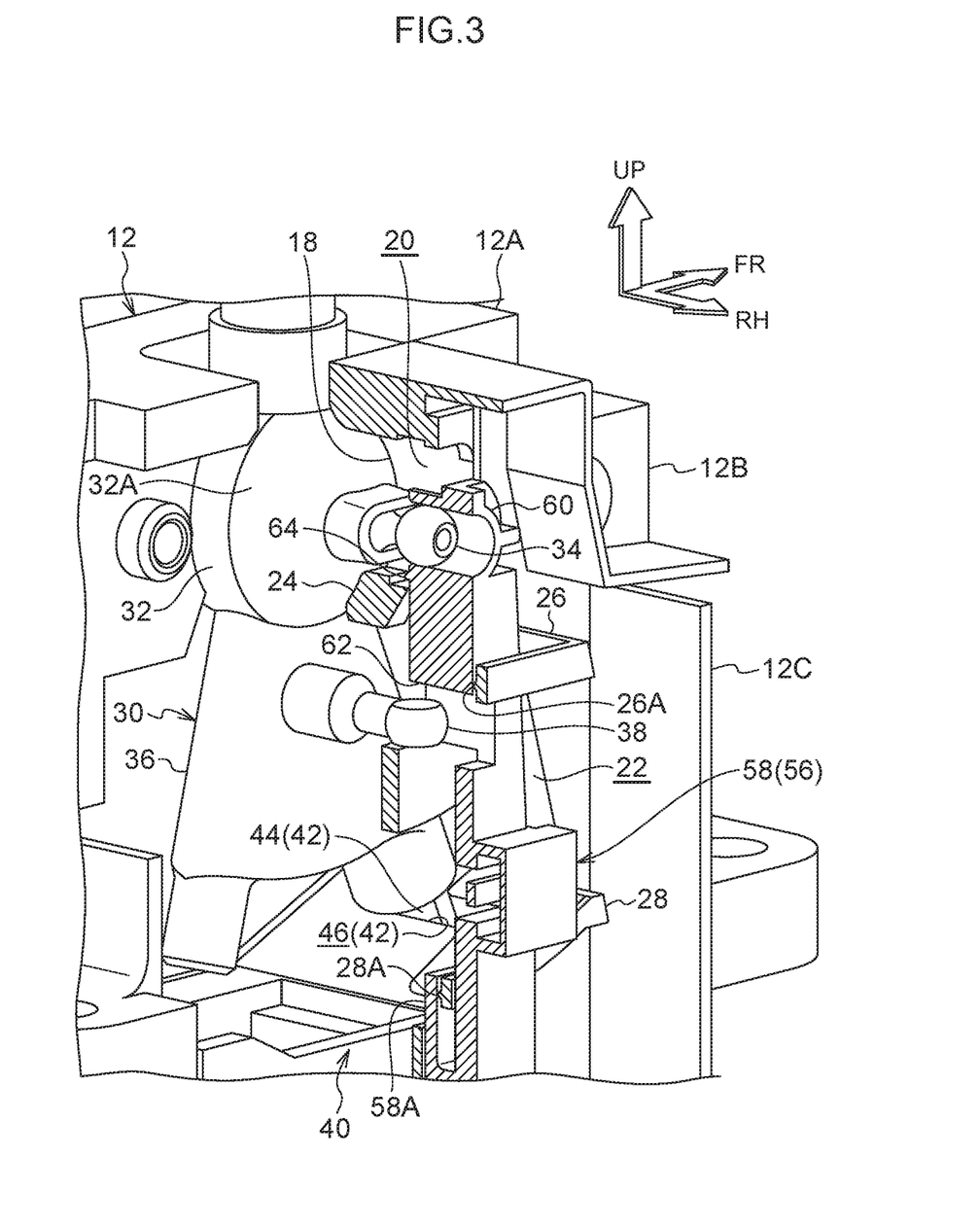
FIG. 3 is a perspective view that is seen from the obliquely right and rear side and shows main portions of the shift lever device relating to the embodiment of the present invention.

A shift lever device 10, which serves as a shift device relating to an embodiment of the present invention, is shown in FIG. 1 in an exploded perspective view that is seen from an obliquely right and rear side. Main portions of the shift lever device 10 are shown in FIG. 3 in a perspective view that is seen from the obliquely right and rear side. Note that, in the drawings, the forward side of the shift lever device 10 is denoted by arrow FR, the right side of the shift lever device 10 is denoted by arrow RH, and the upper side of the shift lever device 10 is denoted by arrow UP.

The shift lever device 10 relating to the present embodiment is a floor-type device, and is set at the vehicle transverse direction central portion of the floor portion (vehicle body side) of the vehicle cabin of a vehicle (an automobile). The forward side, left side and upper side of the shift lever device 10 are directed toward the forward side, the left side and the upper side of the vehicle, respectively.

As shown in FIG. 1 and FIG. 3, a plate 12 (housing), which is made of resin and is substantially shaped as a rectangular parallelepiped box and serves as an accommodating body, is provided at the shift lever device 10. The plate 12 is set at (fixed to) the floor portion of the vehicle cabin, and the interior thereof opens toward the lower side. A left plate 12A, which is substantially shaped as a rectangular parallelepiped box and serves as a first accommodating portion, is provided at the left side portion of the plate 12, and the left plate 12A interior opens to the right side and the lower side. A right plate 12B, which is substantially shaped as a rectangular parallelepiped box and serves as a second accommodating portion, is provided at the right side portion of the plate 12, and the right plate 12B interior opens to the left side and the lower side. An accommodating frame 12C, which is substantially shaped as an upside-down U-shaped plate in cross-section, is provided integrally with the right side of the right plate 12B. The accommodating frame 12C interior opens to the right side and the lower side.

Plural (three in the present embodiment) pins 14, which are shaped as elongated rods and structure assembly portions, pass-through the left plate 12A and the right plate 12B in the left-right direction (axial direction), and the diameters of the right end portions of the pins 14 are enlarged. Push nuts 16, which are substantially shaped as annular plates and structure the assembly portions, are attached to the left end portions of the pins 14 in states in which the pins 14 pass-through the nuts 16. The left plate 12A and the right plate 12B are nipped between the right end portions (the enlarged diameter portions) of the pins 14 and the push nuts 16, and the left plate 12A and the right plate 12B are assembled together.

A shaft receiving surface 18, which is shaped as a spherical surface and serves as a supporting surface, is formed at the upper portion of the plate 12. The shaft receiving surface 18 is formed so as to be divided between the left plate 12A and the right plate 12B, and the interior of the shaft receiving surface 18 opens to the upper side and the lower side.

A through-hole 20, which is rectangular and serves as a rotation guiding portion, is formed so as to pass-through the right wall of the right plate 12B, at the left-right direction central portion of the upper portion thereof. The through-hole 20 communicates the interior of the shaft receiving surface 18 and the interior of the accommodating frame 12C of the plate 12. The through-hole 20 extends in the up-down direction, and the front surface and the rear surface of the through-hole 20 are disposed orthogonally to the front-rear direction. A communicating hole 22, which is substantially trapezoidal and serves as a communication portion, is formed so as to pass-through the right wall of the right plate 12B, at the lower side of the through-hole 20. The communicating hole 22 communicates the interior of the plate 12 and the interior of the accommodating frame 12C, and the lower surface thereof is curved in a shape that is convex toward the lower side.

A holding pillar 24 that serves as a holding portion (temporary holding portion) is formed at the right wall of the right plate 12B, between the through-hole 20 and the communicating hole 22. The holding pillar 24 extends in the front-rear direction, and the left surface thereof structures the shaft receiving surface 18. The right portion of the holding pillar 24 is formed in a right triangular shape in cross-section, and the upper surface of the right portion of the holding pillar 24 is disposed orthogonally to the up-down direction.

A first guide frame 26, which is U-shaped as seen in a plan view and serves as a guiding portion (a first guiding portion), is formed integrally with the right surface of the right plate 12B. The front end portion and the rear end portion of the first guide frame 26 are connected to the front side and the rear side of the upper end portion of the communicating hole 22 of the right plate 12B, respectively. The front-rear direction intermediate portion that connects (bridges) the front end portion and the rear end portion of the first guide frame 26 is disposed orthogonally to the left-right direction, and the front-rear direction intermediate portion of the first guide frame 26 extends in the front-rear direction. A first convex portion 26A, which is semicircular in cross-section and serves as a contacting portion (first contacting portion), is provided integrally with the left surface of the front-rear direction intermediate portion of the first guide frame 26. The first convex portion 26A projects out toward the left side, and extends along the front-rear direction intermediate portion of the first guide frame 26.

A second guide frame 28, which is U-shaped as seen in a plan view and serves as a guiding portion (second guiding portion), is provided integrally with the right surface of the right plate 12B. The front end portion and the rear end portion of the second guide frame 28 are connected to the front side and the rear side of the lower end portion of the communicating hole 22 of the right plate 12B, respectively. The front-rear direction intermediate portion that connects (bridges) the front end portion and the rear end portion of the second guide frame 28 is disposed orthogonally to the left-right direction, and the front-rear direction intermediate portion of the second guide frame 28 is curved in a shape that is convex toward the lower side along the lower surface of the communicating hole 22. A second convex portion 28A, which is semicircular in cross-section and serves as a contacting portion (second contacting portion), is provided integrally with the left surface of the front-rear direction intermediate portion of the second guide frame 28. The second convex portion 28A projects out toward the left side, and extends along the front-rear direction intermediate portion of the second guide frame 28.

Figure 2:
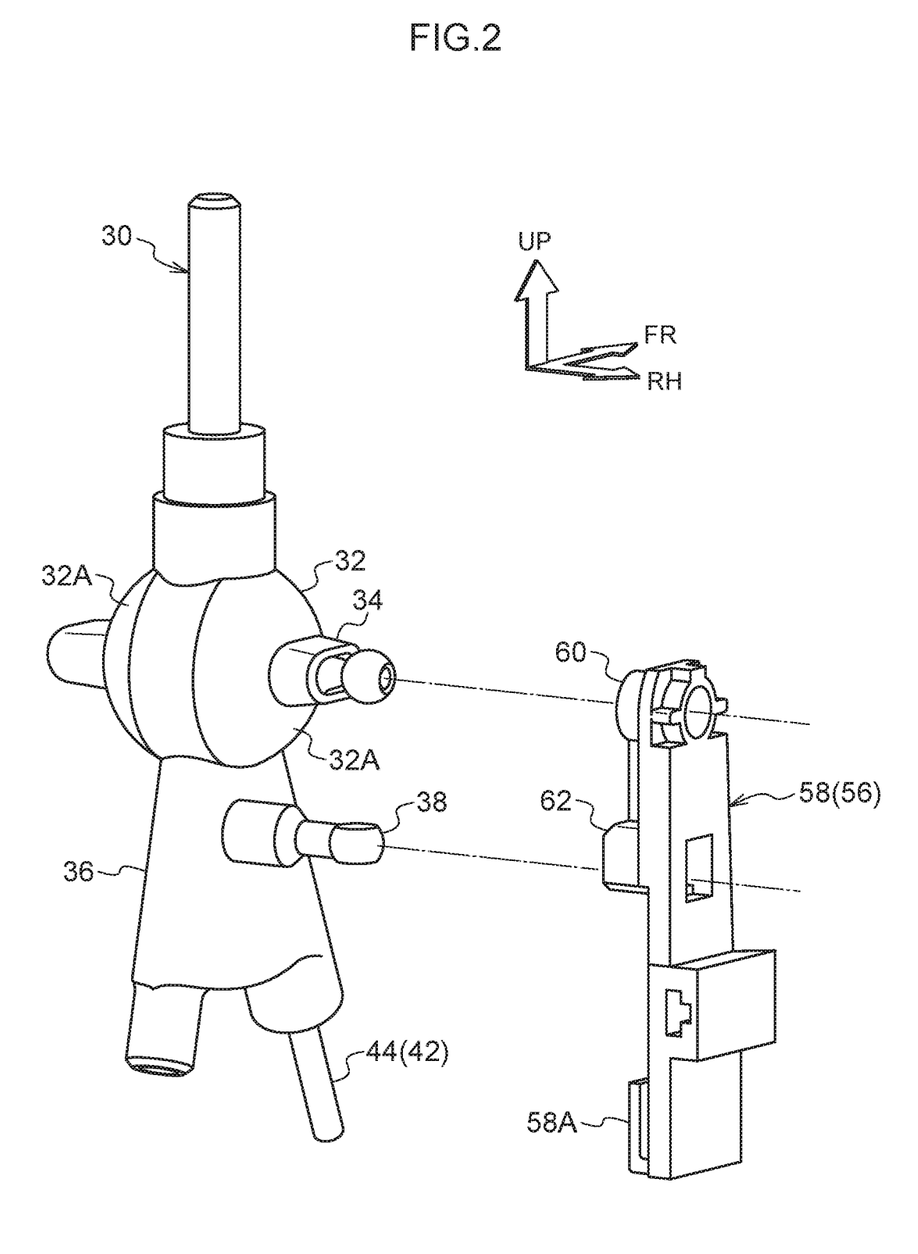
FIG. 2 is an exploded perspective view that is seen from the obliquely right and rear side and shows a lever and a link of the shift lever device relating to the embodiment of the present invention.
Figure 4A:
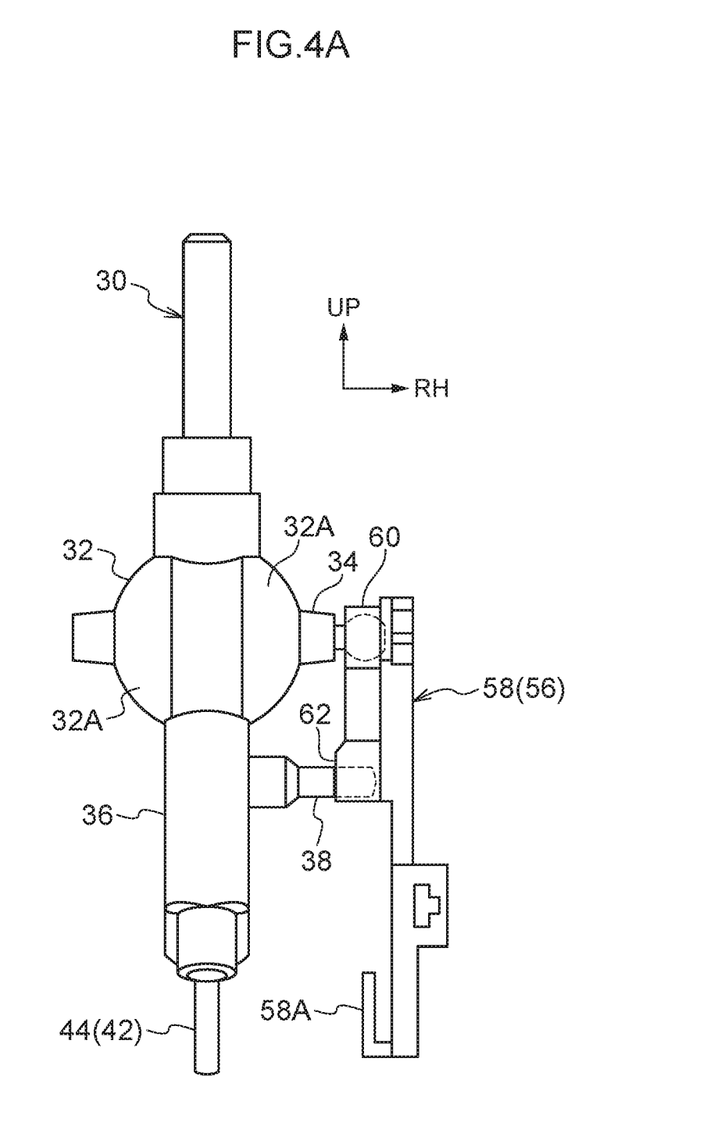
FIG. 4A is a rear view that is seen from a rear side and shows the lever and the link of the shift lever device relating to the embodiment of the present invention.

A lever 30 (see FIG. 2 and FIG. 4A), which is made of resin and is substantially shaped as an elongated pillar and serves as a shift body, is inserted within the plate 12. A spherical shaft 32, which is substantially spherical and serves as a supported portion, is provided at the up-down direction (length direction, axial direction) intermediate portion of the lever 30. The outer peripheral surface of the spherical shaft 32, except for at the upper end portion, the lower end portion, the left end portion, the right end portion, and the front side portion and the rear side portion of the left-right direction central portion thereof, is made to be a shaft surface 32A that is shaped as a spherical surface and serves as a supported surface. The shaft surface 32A is fit-together with the shaft receiving surface 18 of the plate 12. At the shaft surface 32A, the lever 30 is supported by the shaft receiving surface 18 so as to be able to rotate in the front-rear direction (shifting direction, first direction) and in the left-right direction (selecting direction, second direction). The lever 30 can rotate in the front-rear direction and the left-right direction around the spherical shaft 32.

A joint 34, which is shaped as a pillar and serves as a first connecting portion, is provided integrally with the right end portion of the outer peripheral surface of the spherical shaft 32. The joint 34 extends toward the right, and the central axis thereof coincides with the central axis, which is parallel to the left-right direction, of the spherical shaft 32. The proximal end portion (left end portion) of the joint 34 is substantially shaped as a rectangular pillar, and the front surface and the rear surface of the proximal end portion of the joint 34 are curved in convex shapes in the up-down direction. The proximal end portion of the joint 34 passes-through the through-hole 20 of the right plate 12B, and is substantially fit-together with the through-hole 20 in the front-rear direction. The joint 34 can rotate in the up-down direction while being guided by the through-hole 20 at the proximal end portion, and can rotate around the central axis. The distal end portion (right end portion) of the joint 34 is substantially spherical, and the distal end portion of the joint 34 is inserted within the accommodating frame 12C of the right plate 12B.

The portion, which is further toward the upper side than the spherical shaft 32, of the lever 30 extends out to the upper side of the plate 12, and an occupant of the vehicle (e.g., the driver) can rotatingly operate the lever 30 at the upper end portion thereof. The lever 30 is disposed at an "H" position (home position) that serves as a shift position (a predetermined shift position). The lever 30 is rotatingly operated toward the rear side from the "H" position and disposed at a "B" position (brake position) that serves as a shift position. The lever 30 is rotatingly operated toward the left side (or toward the right side) from the "H" position and is disposed at an "N" position (neutral position) that serves as a shift position. Moreover, the lever 30 is rotatingly operated toward the front side from the "N" position, and is disposed at an "R" position (reverse position) that serves as a shift position. The lever 30 is rotatingly operated toward the rear side from the "N" position and is disposed at a "D" position (drive position) that serves as a shift position.

The portion, which is further toward the lower side than the spherical shaft 32, of the lever 30 is made to be a setting portion 36 that is substantially shaped as a fan-shaped plate. The front-rear direction (width direction) dimension of the setting portion 36 becomes larger toward the lower side.

A link operating portion 38, which is substantially solid cylindrical and serves as a second connecting portion, is provided integrally with the right surface of the setting portion 36 at the front-rear direction center of the up-down direction intermediate portion. The link operating portion 38 extends toward the right beneath the joint 34 of the spherical shaft 32, and the central axis thereof is disposed parallel to the left-right direction. The distal end portion (right end portion) of the link operating portion 38 is substantially solid cylindrical. The axial direction of the distal end portion of the link operating portion 38 is disposed parallel to the up-down direction, and the peripheral surface of the distal end portion of the link operating portion 38 is curved in convex shape in the axial direction.

A bottom plate 40 that is substantially shaped as a rectangular plate is disposed at the lower end of the interior of the plate 12. At the front end portion and the rear end portion of the bottom plate 40, movement of the bottom plate 40 toward the lower side is stopped by the front end and the rear end of the interior of the left plate 12A, respectively. Moreover, the above-described pin 14 passes-through the front end portion of the bottom plate 40 in the left-right direction. Due thereto, the bottom plate 40 is fixed to the plate 12 interior. The bottom plate 40 closes-off the lower side of the plate 12 interior. The front side portion of the bottom plate 40 is tilted in a direction heading toward the upper side while heading toward the front side, and the rear side portion of the bottom plate 40 is disposed orthogonally to the up-down direction.

A restricting mechanism 42 that serves as a restricting device is provided between the front end portion of the setting portion 36 of the lever 30 and the front side portion of the bottom plate 40. A gate pin 44, which is solid cylindrical and serves as a restricted portion, is fixed to the front end portion of the setting portion 36. The gate pin 44 extends out toward the lower side from the front end portion of the setting portion 36. A gate groove 46, which has a predetermined shape and serves as a restricting portion, is formed in the front side portion of the bottom plate 40, and the gate groove 46 passes-through the bottom plate 40. The gate pin 44 is inserted in the gate groove 46. Due to the gate pin 44 abutting the peripheral surface of the gate groove 46, rotation of the lever 30 is restricted. Due to the gate pin 44 being moved along the gate groove 46, rotation of the lever 30 is guided.

A detent mechanism 48 that serves as an urging mechanism is provided between the rear end portion of the setting portion 36 of the lever 30 and the rear side portion of the bottom plate 40. A compression coil spring 50 that serves as an urging member and a detent pin 52, which is substantially solid cylindrical and serves as an abutment member, are coaxially inserted in the rear end portion of the setting portion 36. The compression coil spring 50 is disposed at the upper side of the detent pin 52 and urges the detent pin 52 toward the lower side. The detent pin 52 extends out toward the lower side from the rear end portion of the setting portion 36, and the lower end surface (the distal end surface) of the detent pin 52 is curved in a convex shape. A detent slope 54, which is substantially rectangular parallelepiped and serves as an abutted member, is fixed to the upper side of the rear side portion of the bottom plate 40. The upper surface of the detent slope 54 is a detent surface 54A that serves as an inclined surface. The front-rear direction center of the left end portion of the detent surface 54A is made to be a bottom portion (lower end portion). The detent surface 54A is inclined in a direction of heading toward the lower side while heading toward the bottom portion. The lower end surface of the detent pin 52 abuts the bottom portion of the detent surface 54A due to the urging force of the compression coil spring 50. Due thereto, the lever 30 is disposed at the "H" position as described above. At the time when the lever 30 is rotatingly operated from the "H" position, the lower end surface of the detent pin 52 rises up on the detent surface 54A against the urging force of the compression coil spring 50. At the time when rotating operation force is no longer applied to the lever 30 from a state in which the lever 30 is disposed at a rotating position other than the "H" position, the lower end surface of the detent pin 52 is lowered to the bottom portion of the detent surface 54A by the urging force of the compression coil spring 50, and the lever 30 is restored to the "H" position.

A sensor mechanism 56 that serves as a detecting mechanism is accommodated within the accommodating frame 12C of the right plate 12B.

A link 58 (see FIG. 2 and FIG. 4A), which is substantially shaped as an elongated plate and serves as an interlocking body, is provided at the sensor mechanism 56. The link 58 extends in the up-down direction, and is disposed orthogonally to the left-right direction. The upper portion of the link 58 is disposed at the right side of the holding pillar 24 of the right plate 12B, and the link 58 is set apart from the holding pillar 24 at the right side thereof. At the lower side of the holding pillar 24, the upper portion of the link 58 is inserted within the first guide frame 26 of the right plate 12B, and the link 58 is, at the right surface thereof, made to contact the first convex portion 26A of the first guide frame 26, and movement of the link 58 toward the right is restricted. A guiding projection 58A, which is shaped as an L-shaped plate in cross-section and serves as a guided portion, is provided integrally with the lower end portion of the left surface of the link 58. The proximal end side portion (lower side portion) of the guiding projection 58A projects out toward the left side, and the distal end side portion (the upper side portion) thereof extends toward the upper side. The distal end side portion of the guiding projection 58A is inserted within the second guide frame 28 of the right plate 12B. The guiding projection 58A is, at the right surface of the distal end side portion thereof, made to contact the second convex portion 28A of the second guide frame 28, and movement of the link 58 toward the right is restricted. Therefore, movement of the link 58 toward the right is restricted by the first guide frame 26 and the second guide frame 28, and the link 58 is assembled to the right plate 12B.

Figure 5A:
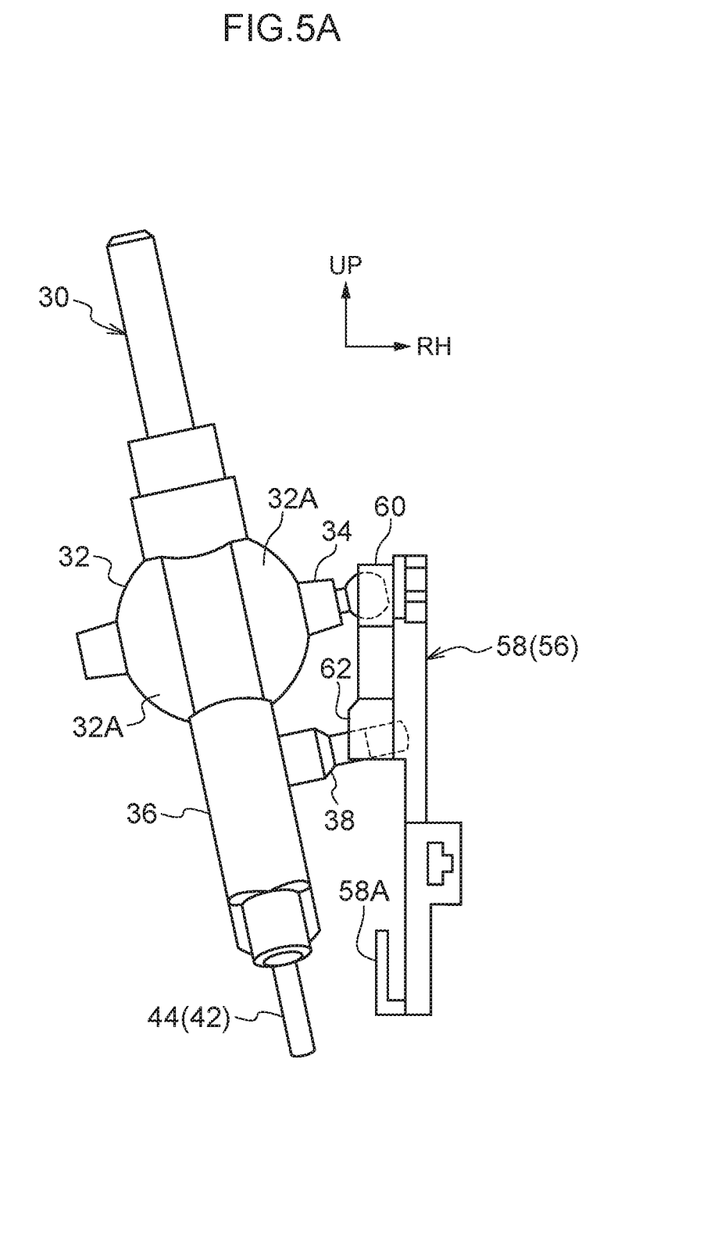
FIG. 5A is a rear view that is seen from the rear side and shows a time when the lever of the shift lever device relating to the embodiment of the present invention is disposed at an "N" position.
Figure 5B:
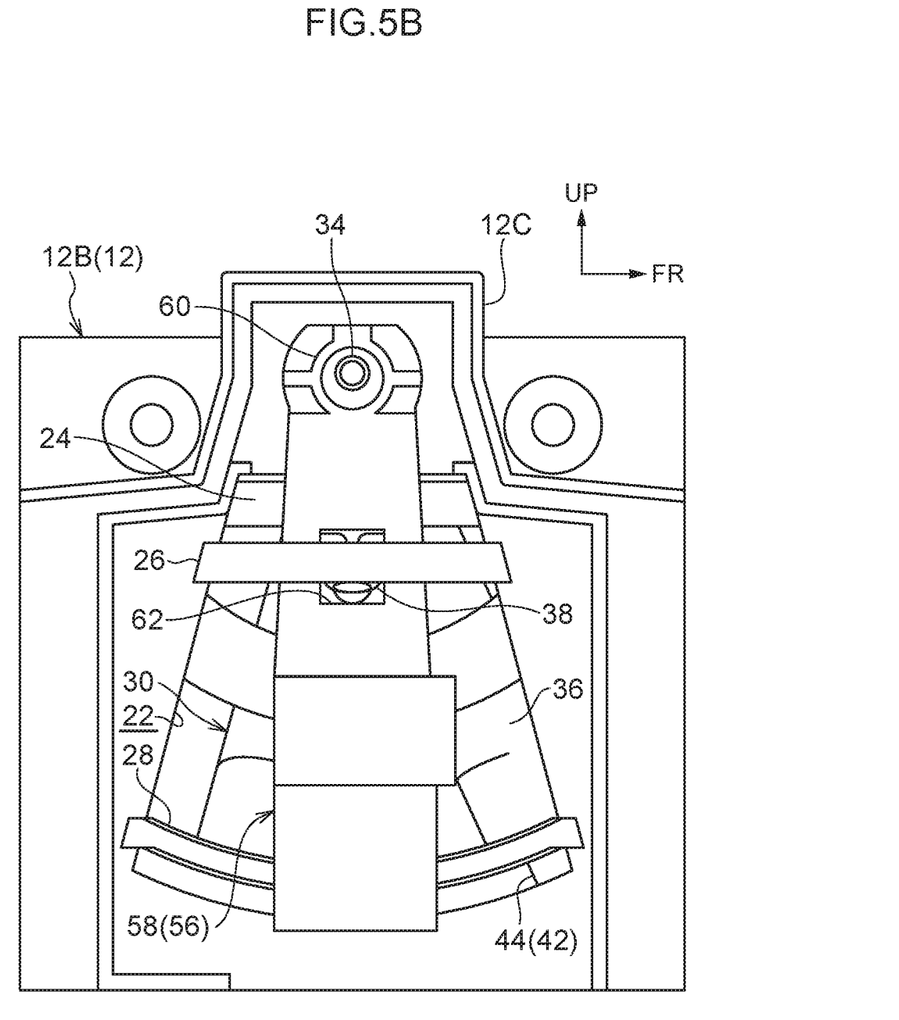
FIG. 5B is a side view that is seen from the right side and shows the time when the lever of the shift lever device relating to the embodiment of the present invention is disposed at the "N" position.

A joint tube 60, which is shaped as a cylindrical tube and serves as a first connected-to portion, is provided integrally with the upper end portion of the link 58. The axial direction of the joint tube 60 interior is disposed parallel to the left-right direction, and the joint tube 60 interior opens to the left side and the right side. The distal end portion of the joint 34 of the lever 34 is fit-together with the joint tube 60 interior over the entire peripheral direction. The distal end portion of the joint 34 restricts movement of the link 58 in the length direction (the up-down direction) and the width direction (the front-rear direction), and permits movement of the link 58 in the wall thickness direction (the left-right direction). Therefore, due to the lever 30 being rotatingly operated toward the left side and the right side, the joint 34 is rotated toward the upper side and the left side and toward the lower side and the right side, respectively (refer to FIG. 5A and FIG. 5B), and the link 58 is moved (slid) toward the upper side and the lower side while the distal end portion of the joint 34 is moved (slid) toward the left side and the right side with respect to the joint tube 60 (the link 58 is not deformed toward the left side and the right side).

Figure 4B:
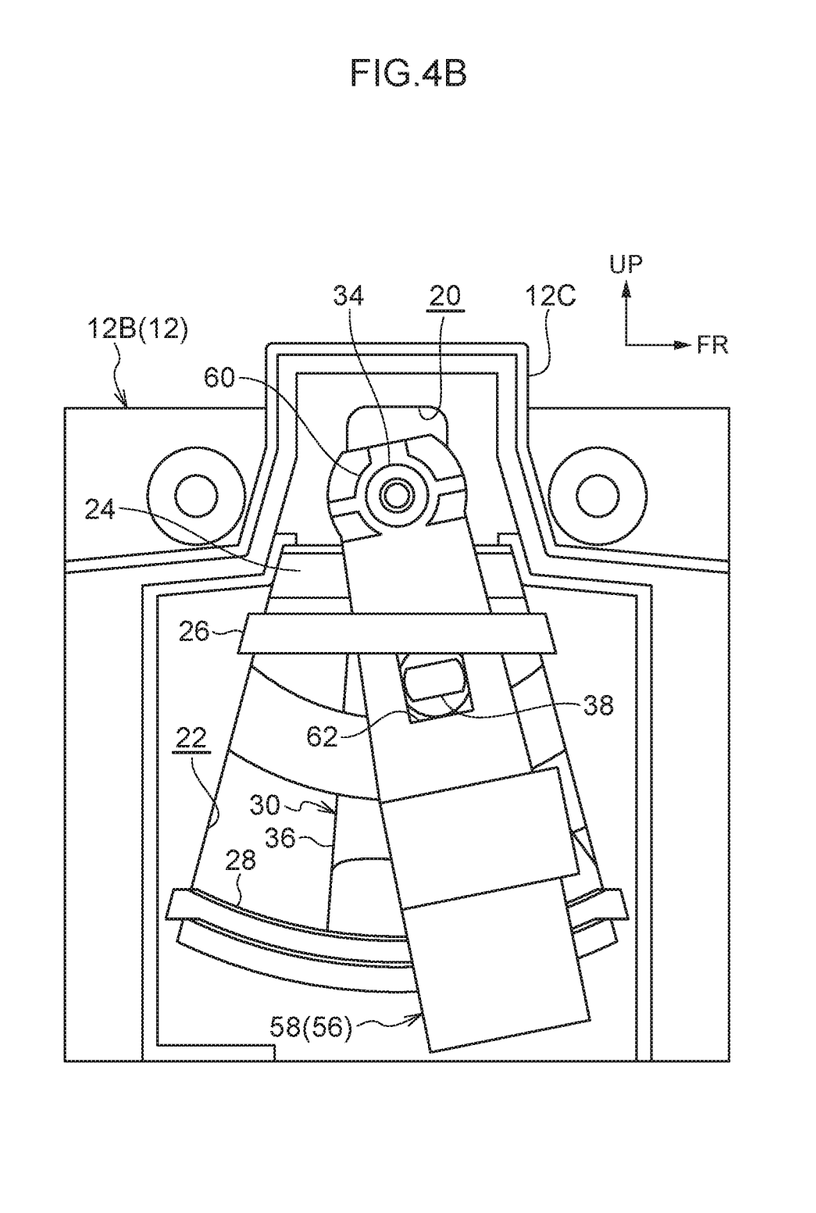
FIG. 4B is a side view that is seen from a right side and shows a time when the lever of the shift lever device relating to the embodiment of the present invention is disposed at a "B" position.

An operation tube 62, which is shaped as a rectangular tube and serves as a second connected-to portion, is provided integrally with the up-down direction intermediate portion of the link 58. The axial direction of the operation tube 62 interior is disposed parallel to the left-right direction, and the operation tube 62 interior opens to the left side and the right side, and opens to the lower side except at the right end portion. The distal end portion of the link operating portion 38 of the lever 30 is fit-together with the operation tube 62 interior in the front-rear direction. The distal end portion of the link operating portion 38 restricts movement of the link 58 in the width direction (the front-rear direction), and permits movement of the link 58 in the length direction (the up-down direction) and the wall thickness direction (the left-right direction). Therefore, due to the lever 30 being rotatingly operated toward the front side and the rear side, the link operating portion 38 is rotated toward the rear side and the front side, respectively, and the link 58 is rotated toward the rear side and the front side around the joint tube 60 side (see FIG. 4B). Moreover, due to the lever 30 being rotatingly operated toward the left side and the right side, the link operating portion 38 is rotated toward the upper side and the right side and toward the lower side and the left side, respectively, and the distal end portion of the link operating portion 38 is moved (slid) toward the right side and the left side with respect to the operation tube 62 (see FIG. 5A and FIG. 5B).

Further, movement of the link 58 toward the upper side and the lower side, and rotation toward the front side and the rear side, are guided by the first convex portion 26A of the first guide frame 26 and the second convex portion 28A of the second guide frame 28 at the right plate 12B.

A holding projection 64, which is trapezoidal in cross-section and serves as a held portion (a temporarily held portion), is provided integrally with the left surface of the upper end portion of the link 58, at the upper side of the right portion of the holding pillar 24 of the right plate 12B. The holding projection 64 projects out toward the left side. The holding projection 64 extends in the front-rear direction, and the lower surface of the holding projection 64 is disposed orthogonally to the up-down direction. Before the distal end portion of the joint 34 of the lever 30 is fit-together with the interior of the joint tube 60 of the link 58, and the distal end portion of the link operating portion 38 of the lever 30 is fit-together with the interior of the operation tube 62 of the link 58, and the lever 30 is connected to the link 58, in the state in which the link 58 is made to contact the first convex portion 26A of the first guide frame 26 and the second convex portion 28A of the second guide frame 28 at the right plate 12B, due to the lower surface of the holding projection 64 abutting the upper surface of the right portion of the holding pillar 24, movement of the link 58 toward the lower side is stopped, and the link 58 can be held (temporarily held) at the right plate 12B.

A magnet 66, which is shaped as a rectangular plate and serves as a detected portion, is fixed by insert molding to the lower portion of the link 58 between the guiding projection 58A and the operation tube 62. The magnet 66 is moved in the up-down direction and is rotated in the front-rear direction integrally with the link 58.

A sensor substrate 68, which is substantially shaped as a rectangular plate and serves as a detector, is provided at the sensor mechanism 56. The sensor substrate 68 is fixed to the interior of the accommodating frame 12C of the right plate 12B by plural screws 70 that serve as assembly members. The sensor substrate 68 is disposed orthogonally to the left-right direction at the right side of the link 58, and the sensor substrate 68 faces the magnet 66 of the link 58 in the left-right direction. The sensor substrate 68 can detect the magnetic force that the magnet 66 generates. Due thereto, due to the position of the magnet 66 in the up-down direction and the front-rear direction being detected, the moved position in the up-down direction and the rotated position in the front-rear direction of the link 58 are detected.

A cover 72, which is substantially shaped as a rectangular parallelepiped box and serves as a covering member, is assembled to the right side of the assembly frame 12C of the right plate 12B. The interior of the cover 72 opens to the left side, and the cover 72 covers the accommodating frame 12C interior from the right side.

Operation of the present embodiment is described next.

At the shift lever device 10 of the above-described structure, the lever 30 is supported, at the shaft surface 32A of the spherical shaft 32, so as to be able to rotate in the front-rear direction and the left-right direction. The sensor mechanism 56 (the link 58 and the sensor substrate 68) is provided at the right side of the lever 30. Further, at the time when the lever 30 is rotated in the left-right direction, the joint 34 of the lever 30 moves the link 58 (the joint tube 60) in the up-down direction. Moreover, at the time when the lever 30 is rotated in the front-rear direction, the link operating portion 38 of the lever 30 rotates the link 58 (the operation tube 62) in the front-rear direction around the joint 34 side. Therefore, due to the sensor substrate 68 detecting the position of the magnet 66 of the link 58 in the up-down direction and the front-rear direction, the moved position in the up-down direction and the rotated position in the front-rear direction of the link 58 are detected, and the shift position of the lever 30 is detected.

Here, at the time when the lever 30 is rotated in the left-right direction, the link 58 is moved in the up-down direction while the joint 34 is moved in the left-right direction with respect to the joint tube 60. Therefore, the need to provide parts between the lever 30 and the joint 34 can be eliminated, and the number of parts can be reduced. Moreover, because it suffices to make the joint 34 be able to move in the left-right direction with respect to the joint tube 60, the structures of the lever 30 (the joint 34) and the link 58 (the joint tube 60) can be made to be simple. Moreover, the accuracy of the position of the joint 34 with respect to the lever 30 can be increased, the accuracy of the position of the link 58 with respect to the shift position of the lever 30 can be increased, and the accuracy of detecting the shift position of the lever 30 can be increased.

Moreover, the joint 34 is provided integrally with the spherical shaft 32 of the lever 30. Therefore, the number of parts can be reduced further. Moreover, the accuracy of the position of the joint 34 with respect to the lever 30 can be increased more, the accuracy of the position of the link 58 with respect to the shift position of the lever 30 can be increased more, and the accuracy of detecting the shift position of the lever 30 can be increased more.

Further, the joint 34 is rotated in the up-down direction while being guided, at the proximal end portion thereof, by the through-hole 20 of the right plate 12B. Therefore, the accuracy of the position of the link 58 with respect to the shift position of the lever 30 can be increased more, and the accuracy of detecting the shift position of the lever 30 can be increased more. Moreover, because the through-hole 20 is formed in the right plate 12B, the structure can be made to be simple.

Moreover, movement in the up-down direction and rotation in the front-rear direction of the link 58 are guided by the first convex portion 26A of the first guide frame 26 and the second convex portion 28A of the second guide frame 28 at the right plate 12B. Therefore, the accuracy of the position of the link 58 with respect to the shift position of the lever 30 can be increased more, and the accuracy of detecting the shift position of the lever 30 can be increased more. Moreover, because the first guide frame 26 and the second guide frame 28 are provided integrally with the right plate 12B, the number of parts can be reduced more.

Moreover, the link 58 and the sensor substrate 68 are assembled to the right plate 12B. Therefore, the accuracy of the position of the sensor substrate 68 with respect to the link 58 can be increased, the accuracy of detecting the position of the link 58 by the sensor substrate 68 can be increased, and the accuracy of detecting the shift position of the lever 30 can be increased more.

Further, the link operating portion 38 of the lever 30 is formed in a convex shape, and the interior of the operation tube 62 of the link 58 is formed in the shape of a hole. Therefore, differently than a case in which the operation tube 62 is provided at the lever 30 and the link operating portion 38 is provided at the link 58, stress (torque due to rotation of the link operating portion 38 in the front-rear direction) that is applied from the lever 30 (the link operating portion 38) to the link 58 (the operation tube 62) can be made to be small.

Moreover, at the time when the lever 30 is rotatingly operated from the "H" position toward the left side (the "N" position side), the setting portion 36 of the lever 30 is tilted toward the right side (the link 58 side) from a state of being parallel to the up-down direction, and the link operating portion 38 is provided at the right side of the setting portion 36. Therefore, at the time when the lever 30 is rotated in the left-right direction, separation of the link operating portion 38 of the lever 30 and the operation tube 62 of the link 58 can be suppressed, and the left-right direction dimensions of the link operating portion 38 and the operation tube 62 can be made to be small.

Moreover, the link operating portion 38 is provided integrally with the setting portion 36 of the lever 30. Therefore, the number of parts can be reduced more. Moreover, the accuracy of the position of the link operating portion 38 with respect to the lever 30 can be increased, the accuracy of the position of the link 58 with respect to the shift position of the lever 30 can be increased more, and the accuracy of detecting the shift position of the lever 30 can be increased more.

Further, at the time when the shift lever device 10 is assembled, first, the lever 30 (including the gate pin 44 of the restricting mechanism 42, and the compression coil spring 50 and the detent pin 52 of the detent mechanism 48) and the bottom plate 40 (including the gate groove 46 of the restricting mechanism 42 and the detent slope 54 of the detent mechanism 48) are assembled to the left plate 12A of the plate 12 from the right side. At this time, the gate pin 44 is inserted in the gate groove 46, and the lower end surface of the detent pin 52 is made to abut the detent surface MA of the detent slope 54 by the urging force of the compression coil spring 50.

Next, the right plate 12B of the plate 12 is assembled to the left plate 12A from the right side by the plural pins 14 and push nuts 16. At this time, the pin 14 is passed-through the right plate 12B and the left plate 12A from the right side, and the left end portions of the pins 14 are passed-through (attached to) the push nuts 16 from the left side, and the right plate 12B is fixed to the left plate 12A. Moreover, the pins 14 are passed-through the front end portion of the bottom plate 40 from the right side, and the bottom plate 40 is fixed to the frame 12 interior. Moreover, the link 58 (including the magnet 66) of the sensor mechanism 56 is made to contact the first convex portion 26A of the first guide frame 26 and the second convex portion 28A of the second guide frame 28 at the right plate 12B, and the link 58 is assembled to the interior of the accommodating frame 12C of the right plate 12B. Due to the right plate 12B being assembled to the left plate 12A from the right side, the distal end portion of the joint 34 of the lever 30 is fit-together with the interior of the joint tube 60 of the link 58, and the distal end portion of the link operating portion 38 of the lever 30 is fit-together with the interior of the operation tube 68 of the link 58, and the lever 30 is connected to the link 58.

Next, the sensor substrate 68 of the sensor mechanism 56 is assembled to the interior of the accommodating frame 12C of the right plate 12B from the right side by the plural screws 70. Finally, the cover 72 is assembled to the accommodating frame 12C from the right side.

Here, at the time when the right plate 12B is assembled to the left plate 12A, not only is the link 58 made to contact the first convex portion 26A of the first guide frame 26 and the second convex portion 28A of the second guide frame 28 at the right plate 12B, but also, the lower surface of the holding projection 64 of the link 58 is made to abut the upper surface of the right portion of the holding pillar 24, and the link 58 is held (temporarily held) at the right plate 12B. Therefore, the distal end portion of the joint 34 can easily be fit-together with the joint tube 60 interior, and the distal end portion of the link operating portion 38 can easily be fit-together with the operation tube 62 interior, and the lever 30 can easily be connected to the link 58.

Moreover, the axial direction of the joint 34 and the axial direction of the link operating portion 38 are disposed parallel to the left-right direction (are disposed parallel to one another), and the axial direction of the joint tube 60 interior and the axial direction of the operation tube 62 interior are disposed parallel to the left-right direction (are disposed parallel to one another). Therefore, the distal end portion of the joint 34 can more easily be fit-together with the joint tube 60 interior, and the distal end portion of the link operating portion 38 can more easily be fit-together with the operation tube 62 interior, and the lever 30 can more easily be connected to the link 58.

Further, the link 58 is assembled to the accommodating frame 12C interior (the right side) of the right plate 12B, and the sensor substrate 68 is assembled to the accommodating frame 12C interior at the right side of the link 58, and the cover 72 is assembled to the accommodating frame 12C from the right side. Therefore, the link 58, the sensor substrate 68 and the cover 72 can easily be assembled to the right side of the right plate 12B, and unidirectional assembly from the right side, whose reference is the left plate 12A of the shift lever device 10, can easily be made to be possible.

Note that, in the present embodiment, the joint 34 is provided at the lever 30, and the joint tube 60 is provided at the link 58. However, the joint tube 60 (or only the first connection hole of the interior) may be provided at the lever 30, and the joint 34 may be provided at the link 58.

Moreover, in the present embodiment, the link operating portion 38 is provided at the lever 30, and the operation tube 62 is provided at the link 58. However, the operation tube 62 (or only the second connection hole of the interior) may be provided at the lever 30, and the link operating portion 38 may be provided at the link 58.

Further, in the present embodiment, the sensor mechanism 56 is provided at the right side (a side) of the lever 30.

However, the sensor mechanism 56 may be provided at a side that is the left side, the front side, or the rear side or the like of the lever 30.

Moreover, in the present embodiment, the shift lever device 10 is made to be a floor-type device, and is set at the floor portion of the vehicle cabin. However, the shift lever device 10 may be set at the instrument panel of the vehicle cabin or at the steering column.

The disclosure of Japanese Patent Application No. 2016-201506, which was filed on Oct. 13, 2016, is, in its entirety, incorporated by reference into the present specification.

EXPLANATION OF REFERENCE NUMERALS

10 shift lever device (shift device)
12 plate (accommodating body)
20 through-hole (rotation guiding portion)
26 first guide frame (guiding portion)
28 second guide frame (guiding portion)
30 lever (shift body)
32 spherical shaft (supported portion)
32A shaft surface (supported surface)
34 joint (first connecting portion)
38 link operating portion (second connecting portion)
58 link (interlocking body)
60 joint tube (first connected-to portion)
62 operation tube (second connected-to portion)
68 sensor substrate (detector)

The invention claimed is:

1. A shift device comprising:
a shift body that is rotated in a first direction and a second direction such that a shift position of the shift body is changed;
a first connecting portion that is provided at the shift body;
a second connecting portion that is provided at the shift body;
an interlocking body that is provided at a second direction side of the shift body;
a first connected-to portion that is provided at the interlocking body and to which the first connecting portion is connected, wherein, when the shift body is rotated in the second direction, the first connecting portion is moved toward the second direction side and moves the interlocking body;
a second connected-to portion that is provided at the interlocking body and to which the second connecting portion is connected, wherein, when the shift body is rotated in the first direction, the second connecting portion rotates the interlocking body around a first connecting portion side; and
a detector that is provided at the second direction side of the shift body, and that detects a position of the interlocking body such that the shift position of the shift body is detected.

2. The shift device of claim 1, wherein the second connecting portion is formed in a convex shape, and the second connected-to portion has a hole in which the second connecting portion is inserted.

3. The shift device of claim 1, wherein the second connecting portion is provided at an interlocking body side of the shift body.

4. The shift device of claim 1, further comprising a guiding portion that guides the interlocking body.

5. The shift device of claim 1, further comprising an accommodating body that accommodates the shift body, and that can hold the interlocking body in a state in which the shift body is not connected thereto.

6. The shift device of claim 1, further comprising an accommodating body that accommodates the shift body, wherein a rotation guiding portion that guides rotation of the first connecting portion is provided at the accommodating body.

7. The shift device of claim 1, further comprising an accommodating body that accommodates the shift body, to which the interlocking body is assembled, and to which the detector is assembled at a second direction side of the interlocking body.

8. The shift device of claim 1, wherein the first connecting portion and the second connecting portion are disposed in parallel, and the first connected-to portion and the second connected-to portion are disposed in parallel.

9. A shift device comprising:
a shift body that is rotated in a first direction and a second direction such that a shift position of the shift body is changed;
a first connecting portion that is provided at the shift body;
a second connecting portion that is provided at the shift body;
an interlocking body that is provided at a second direction side of the shift body;
a first connected-to portion that is provided at the interlocking body and to which the first connecting portion is connected, wherein, when the shift body is rotated in the second direction, the first connecting portion is moved toward the second direction side and moves the interlocking body;
a second connected-to portion that is provided at the interlocking body and to which the second connecting portion is connected, wherein, when the shift body is rotated in the first direction, the second connecting portion rotates the interlocking body around a first connecting portion side; and
a detector that is provided at the second direction side of the shift body, and that detects a position of the interlocking body such that the shift position of the shift body is detected,
further comprising a supported portion that is provided at the shift body, and at which a supported surface that is shaped as a spherical surface is provided, the shift body being supported at the supported surface such that the shift body is rotatable in the first direction and the second direction, and the first connecting portion being provided at the supported portion.

* * * * *